H. R. KINGMAN.
FLUID GEAR.
APPLICATION FILED DEC. 26, 1907.

905,885.

Patented Dec. 8, 1908.
2 SHEETS—SHEET 2.

WITNESSES:

INVENTOR.
Herbert Roland Kingman

H. R. KINGMAN.
FLUID GEAR.
APPLICATION FILED DEC. 26, 1907.

905,885.

Patented Dec. 8, 1908.
3 SHEETS—SHEET 3.

DETAILS OF END CAPS -E-

WITNESSES:  Herbert Roland Kingman  INVENTOR.

UNITED STATES PATENT OFFICE.

HERBERT ROLAND KINGMAN, OF MOUNT VERNON, ILLINOIS.

FLUID-GEAR.

No. 905,885.　　　　Specification of Letters Patent.　　　Patented Dec. 8, 1908.

Application filed December 26, 1907. Serial No. 408,050.

*To all whom it may concern:*

Be it known that I, HERBERT ROLAND KINGMAN, a citizen of the United States, residing at Mount Vernon, in the State of Illinois, have invented a new and useful Improvement in Fluid-Gears, of which the following is a specification.

My invention relates particularly to transmission gears in which a fluid is employed to transmit motion from driving parts to driven parts.

My primary object is to provide a gear which transmits power at variable speed to a driven member, from a driving member revolving at constant speed, or which transmits power at a uniform speed to a driven member from a driving member revolving at a variable speed, with a high degree of efficiency, at the same time capable of being constructed simply and substantially and perfectly balanced with reference to the rotating axis, so as to permit of revolving at a very high rate of speed.

The invention is illustrated in the accompanying drawing in which

Figure 1:
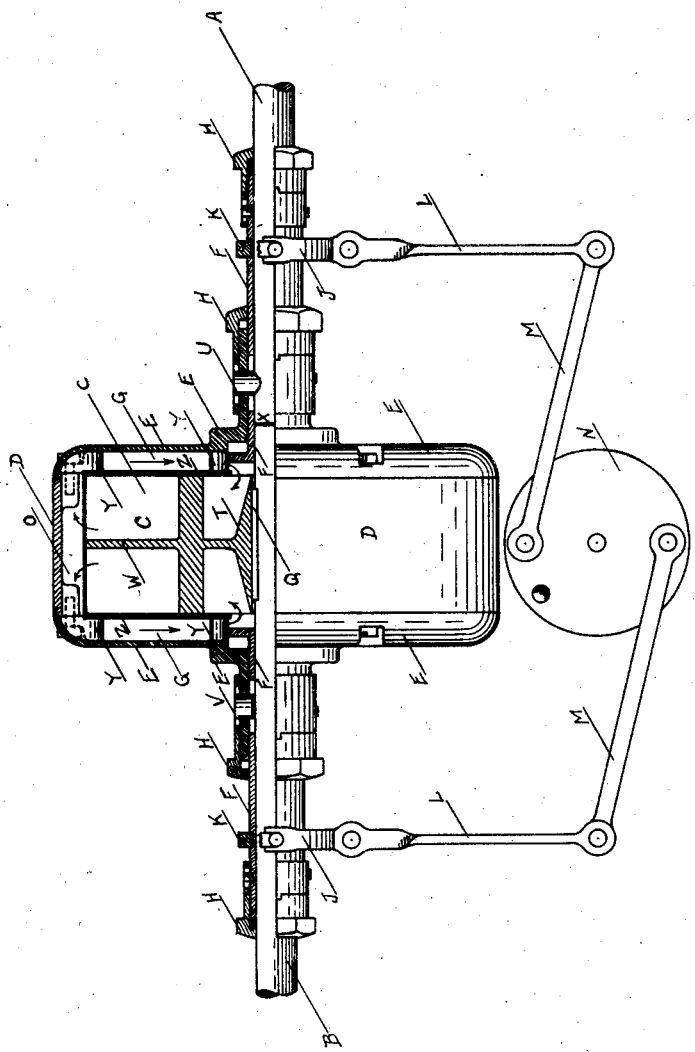
Figure 2:
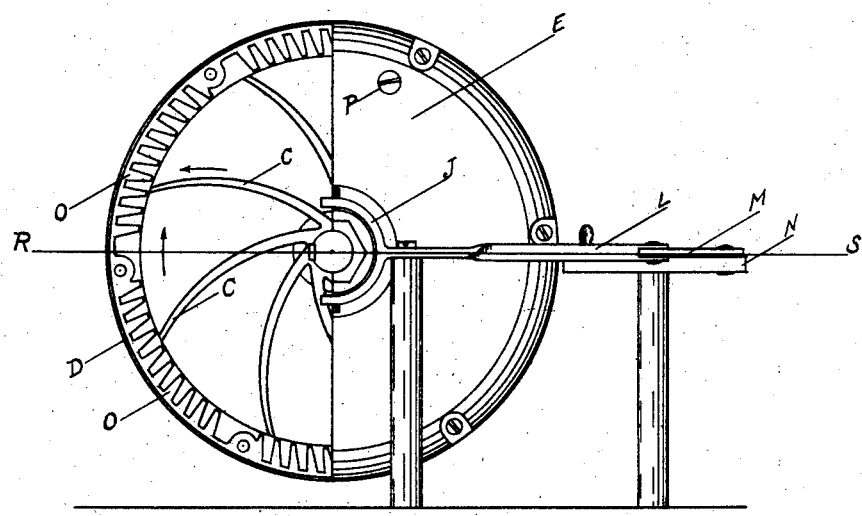
Figure 3:
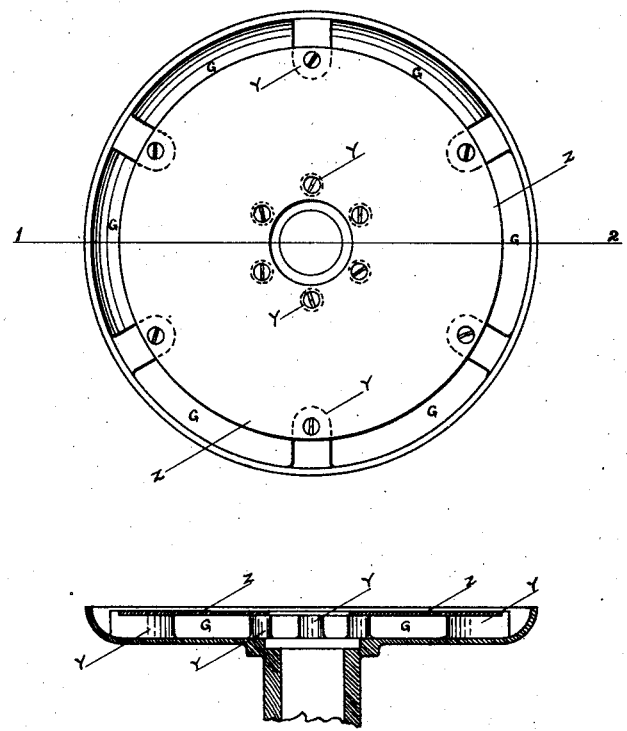

Figure 1 represents a plan view, half of which is shown in section in a plane passing through the axis of rotation as R. S. Fig. 2; and Fig. 2 represents an end elevation with half of the end cap E removed, showing the ends of the rotor vanes. Fig. 3, represents the end caps —E— in detail, showing an end elevation and a sectional view on the line 1—2 of said end elevation.

The gear consists of a fluid tight casing containing on its inside circumference a plurality of slots or teeth O, and attached to the driven shaft, within which casing revolve a plurality of impeller blades or vanes C, attached to the driving shaft.

B, Fig. 1 represents a driving shaft receiving its motion from any source of power and carrying the impeller vanes C, and their hub T, keyed to the said shaft with the key Q, the vanes being divided into separate divisions and strengthened by the rib W, the whole forming the rotor or driving member.

A, Fig. 1 represents the driven shaft attached rigidly to the end cap E, of the casing, by means of the pin U. The casing, consisting of the shell D, the end caps E, together with the valves F, and the stuffing boxes H, forms with the shaft A, the driven member. The ends of the two shafts A, and B, are separated by a slight clearance X.

The casing consists of an annular shell or cylinder D, containing on its inside circumference a number of slots or teeth cut parallel to the axis of the cylinder similar to an internal gear. This construction is represented at O—O Fig. 2. This cylinder or shell is closed at each end by caps E, which caps contain double walls and which also form the bearings for the shafts. The inner walls Z, of the end caps E, are supported at intervals on lugs Y, from the outer walls and are constructed of such a size as to leave openings around the hub and also around the circumference, which openings form passages from the space between the double walls to the interior of the cylinder or shell D. Except for the space occupied by the supporting lugs Y, the free space G between the outer walls of the end caps and the inner walls Z, is unencumbered, as shown in Fig. 3, which shows the details of the end caps E. The passages at the circumference lie adjacent to the ends of the slots or teeth O, and the passages at the center lie around the shaft and are closed or opened by means of sliding valves F, one of which forms the bearing in which the driving shaft B, revolves. The valves F, slide back and forth within the shells formed by the end caps E, and are moved and controlled by the rings K, in which they revolve. The rings K, are operated by means of forks J, attached to lever arms L, pivoted as shown in Fig. 1 and controlled by any convenient wheel N. In the case of automatic control, these levers are attached to a centrifugal or inertia governor mounted on the driven shaft. The stuffing box caps H, are for the purpose of holding the packing around the sliding valves and shafts to prevent the fluid contained in the casing from leaking out.

P, is a plug in the casing by means of which it may be filled.

The operation of the gear is as follows:—
In the position of the valves F, as shown, half way open, upon the revolution of the vanes C, the fluid with which the case is filled, is thrown by centrifugal force along the vanes as indicated by the arrows and out at a tangent to the circle of rotation of the tips of the vanes, into the slots or teeth O. The impact of the moving fluid against the teeth causes the casing to revolve at a speed inversely proportional to the power taken from the gear and approaches the speed of the vanes at no load. After the impact with the teeth, the fluid flows out at either end of the slots, back between the walls of the casing and is drawn in at the hub through the openings between the lugs Y, to repeat the circuit as indicated by the arrows in Fig. 1. When the valves F, are caused to slide in along the shaft toward the hub and close the passages, the circulation of the fluid is stopped, none is thrown off from the tips of the vanes because the slots are full, and the casing remains stationary while the vanes revolve.

Having thus described my invention, what I claim as new and desire to secure by Letters Patent is:—

1. In a fluid gear, the combination of a fluid tight casing, a rotor or moving part in said casing adapted to rotate independent of said casing and forming a fluid circuit with said casing, a fluid, and means for causing, directing and controlling the flow of said fluid from the rotor or driving member to the casing or driven member in their plane of rotation and tangential to the circumference or circle of rotation of the rotor substantially as described.

2. In a fluid gear, the combination of a fluid tight casing, a rotor or moving part in said casing adapted to rotate independent of said casing, forming a fluid circuit with said casing and having impeller blades or arms adapted to cause and direct the flow of the fluid from said rotor to said casing, the interior surface of the circumference of which casing contains a plurality of projections or teeth against which the fluid is directed and thrown, in their plane of rotation and tangential to the circumference or circle of rotation of the rotor, and valves in the path of the flow or circulation of the fluid to control or prevent the flow or circulation of said fluid at will.

3. In a fluid gear, the combination of a fluid tight casing, a rotor revoluble in said casing, slots or teeth on the interior surface of the circumference of said casing, hollow chambers in the faces of said casing and valves between said chambers and the interior of said casing substantially as described.

4. In a fluid gear, the combination of a fluid tight casing, a rotor or revoluble part in said casing forming a fluid circuit with said casing and cylindrical valves operated along the shafts for the purpose of controlling the circulation of said fluid in said circuit substantially as described.

5. In a fluid gear, the combination of a fluid tight casing, a rotor or revoluble part in said casing forming a fluid circuit with said casing, hollow chambers in the faces of said casing and cylindrical valves in said circuit and operated along or around the shafts for the purpose of controlling and regulating the circulation of said fluid in said circuit.

In testimony whereof I have hereunto set my hand.

HERBERT ROLAND KINGMAN.

Witnesses:
G. GALE GILBERT,
RAY W. HITCHCOCK.